US012397471B2

(12) United States Patent
Wang et al.

(10) Patent No.: US 12,397,471 B2
(45) Date of Patent: Aug. 26, 2025

(54) ULTRASONIC MACHINING AN APERTURE IN A WORKPIECE

(71) Applicant: Raytheon Technologies Corporation, Farmington, CT (US)

(72) Inventors: Zhigang Wang, South Windsor, CT (US); John D. Riehl, Hebron, CT (US); Robin H. Fernandez, East Haddam, FL (US); Andrzej E. Kuczek, Bristol, CT (US); Gajawalli V. Srinivasan, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/554,748

(22) Filed: Dec. 17, 2021

(65) Prior Publication Data

US 2023/0191658 A1 Jun. 22, 2023

(51) Int. Cl.
*B28B 11/00* (2006.01)
*B28B 11/08* (2006.01)
(Continued)

(52) U.S. Cl.
CPC ...... *B28B 11/0881* (2013.01); *B28B 13/0275* (2013.01); *B28B 17/0081* (2013.01); *B28B 2013/0265* (2013.01)

(58) Field of Classification Search
CPC ........................ B28B 11/0881; B28B 13/0275
See application file for complete search history.

(56) References Cited

U.S. PATENT DOCUMENTS 4,754,115 A * 6/1988 Rhoades ................. B24B 47/20
219/69.15
4,828,052 A 5/1989 Duran
(Continued)

FOREIGN PATENT DOCUMENTS

JP S63103941 U * 7/1988
WO 2021100705 A1 5/2021

OTHER PUBLICATIONS

Dhinakaran, V., Katiyar, J.K. and Jagadeesha, T., 2021. Mechanics and Material Removal Modeling and Design of Velocity Transformers in Ultrasonic Machining. In Mechatronic Systems Design and Solid Materials (pp. 99-146). Apple Academic Press. (Year: 2021).*
(Continued)

*Primary Examiner* — Nicholas R Krasnow
(74) *Attorney, Agent, or Firm* — Getz Balich LLC

(57) ABSTRACT

A method is provided for machining a workpiece. During this machining method, an aperture is formed in the workpiece using a machining system. The machining system includes an ultrasonic machining device, a slurry delivery device and a controller. The forming of the aperture includes delivering a slurry to an interface between the ultrasonic machining device and the workpiece using the slurry delivery device, and transmitting ultrasonic vibrations into the slurry using the ultrasonic machining device. A feedback parameter is monitored during the forming of the aperture using the controller. A slurry delivery parameter for the slurry delivery device is adjusted during the forming of the aperture based on the feedback parameter using the controller.

17 Claims, 6 Drawing Sheets

(51) Int. Cl.
*B28B 13/02* (2006.01)
*B28B 17/00* (2006.01)

(56) References Cited

U.S. PATENT DOCUMENTS

| | | | | |
|---|---|---|---|---|
| 4,926,309 | A * | 5/1990 | Wu | G05B 19/4163 706/904 |
| 6,458,225 | B1 * | 10/2002 | Statnikov | C21D 10/00 188/73.1 |
| 2001/0027354 | A1 * | 10/2001 | Kakino | G05B 19/4163 700/173 |
| 2019/0143431 | A1 | 5/2019 | Luo | |
| 2020/0324346 | A1 * | 10/2020 | Whittle | B23B 37/00 |
| 2021/0260713 | A1 | 8/2021 | Song | |
| 2022/0161387 | A1 | 5/2022 | Yeo | |

OTHER PUBLICATIONS

Goswami, D. and Chakraborty, S., 2015. Parametric optimization of ultrasonic machining process using gravitational search and fireworks algorithms. Ain Shams Engineering Journal, 6(1), pp. 315-331. (Year: 2015).*

Kumar, J., 2013. Ultrasonic machining—a comprehensive review. Machining Science and Technology, 17(3), pp. 325-379. (Year: 13).*

EP search report for EP22213177.3 dated Nov. 24, 2023.

* cited by examiner

ULTRASONIC MACHINING AN APERTURE IN A WORKPIECE

BACKGROUND OF THE DISCLOSURE

1. Technical Field

This disclosure relates generally to machining and, more particularly, to ultrasonic machining.

2. Background Information

Ultrasonic machining may be used to form an aperture in a workpiece. Various systems and method for ultrasonic machining are known in the art. While these known ultrasonic machining systems and methods have various benefits, there is still room in the art for improvement. For example, during known methods, material removal rate may slow and a tool tip may wear down quickly from constant impact of abrasive particles due to micro erosion mechanisms during ultrasonic machining of deep apertures. There is a need in the art therefore for improved system and method for ultrasonic machining deep apertures in a workpiece.

SUMMARY OF THE DISCLOSURE

According to an aspect of the present disclosure, a method is provided for machining a workpiece. During this machining method, an aperture is formed in the workpiece using a machining system. The machining system includes an ultrasonic machining device, a slurry delivery device and a controller. The forming of the aperture includes delivering a slurry to an interface between the ultrasonic machining device and the workpiece using the slurry delivery device, and transmitting ultrasonic vibrations into the slurry using the ultrasonic machining device. A feedback parameter is monitored during the forming of the aperture using the controller. A slurry delivery parameter for the slurry delivery device is adjusted during the forming of the aperture based on the feedback parameter using the controller.

According to another aspect of the present disclosure, another method is provided for machining a workpiece. During this machining method, a slurry is delivered to an interface between an ultrasonic machining device and the workpiece. Ultrasonic vibrations are transmitted into the slurry at the interface using the ultrasonic machining device to form an aperture in the workpiece. The slurry and debris from the forming of the aperture are extracted through a passage that extends within the ultrasonic machining device to a tip of the ultrasonic machining device.

According to still another aspect of the present disclosure, a machining system is provided for forming an aperture in a workpiece. The machining system includes a slurry delivery device, an ultrasonic machining device and a controller. The slurry delivery device is configured to deliver a slurry to an interface between the ultrasonic machining device and the workpiece. The ultrasonic machining device is configured to transmit ultrasonic vibrations into the slurry at the interface to form the aperture in the workpiece. The controller configured to: monitor a feedback parameter during the forming of the aperture; provide a control signal based on the feedback parameter; and communicate the control signal to the slurry delivery device to adjust a parameter of the delivery of the slurry to the interface.

The slurry and the debris may be drawn from the interface into the passage using a vacuum.

The method may also include: monitoring a feedback parameter during the forming of the aperture; and adjusting a slurry delivery parameter for the delivery of the slurry to the interface during the forming of the aperture based on the feedback parameter.

The workpiece may be configured from or otherwise include a ceramic matrix composite material.

The slurry may include a plurality of abrasive particles within a carrier liquid.

The plurality of abrasive particles may be configured from or otherwise include a carbide and/or diamond.

The slurry delivery parameter may be a pressure of the slurry.

The slurry delivery parameter may be a flowrate of the slurry.

The adjusting of the slurry delivery parameter may initiate flushing out of the slurry at the interface by directing the slurry through the ultrasonic machining device.

The slurry may be pumped through the ultrasonic machining device to the interface.

The slurry may be drawn out from the interface into the ultrasonic machining device.

The feedback parameter may be a load on the ultrasonic machining device.

The feedback parameter may be a forming rate of the aperture.

The feedback parameter may be a size of a tool of the ultrasonic machining device.

The slurry delivery parameter may be adjusted based on a physics-based model.

The slurry delivery device may include a passage that extends within the ultrasonic machining device to a tip of the ultrasonic machining device. The slurry may be delivered to the interface through the passage during the forming of the aperture.

The slurry delivery device may include a passage that extends within the ultrasonic machining device to a tip of the ultrasonic machining device. The slurry may be removed from the interface through the passage during the forming of the aperture.

The workpiece may be configured as or otherwise include a component of a gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
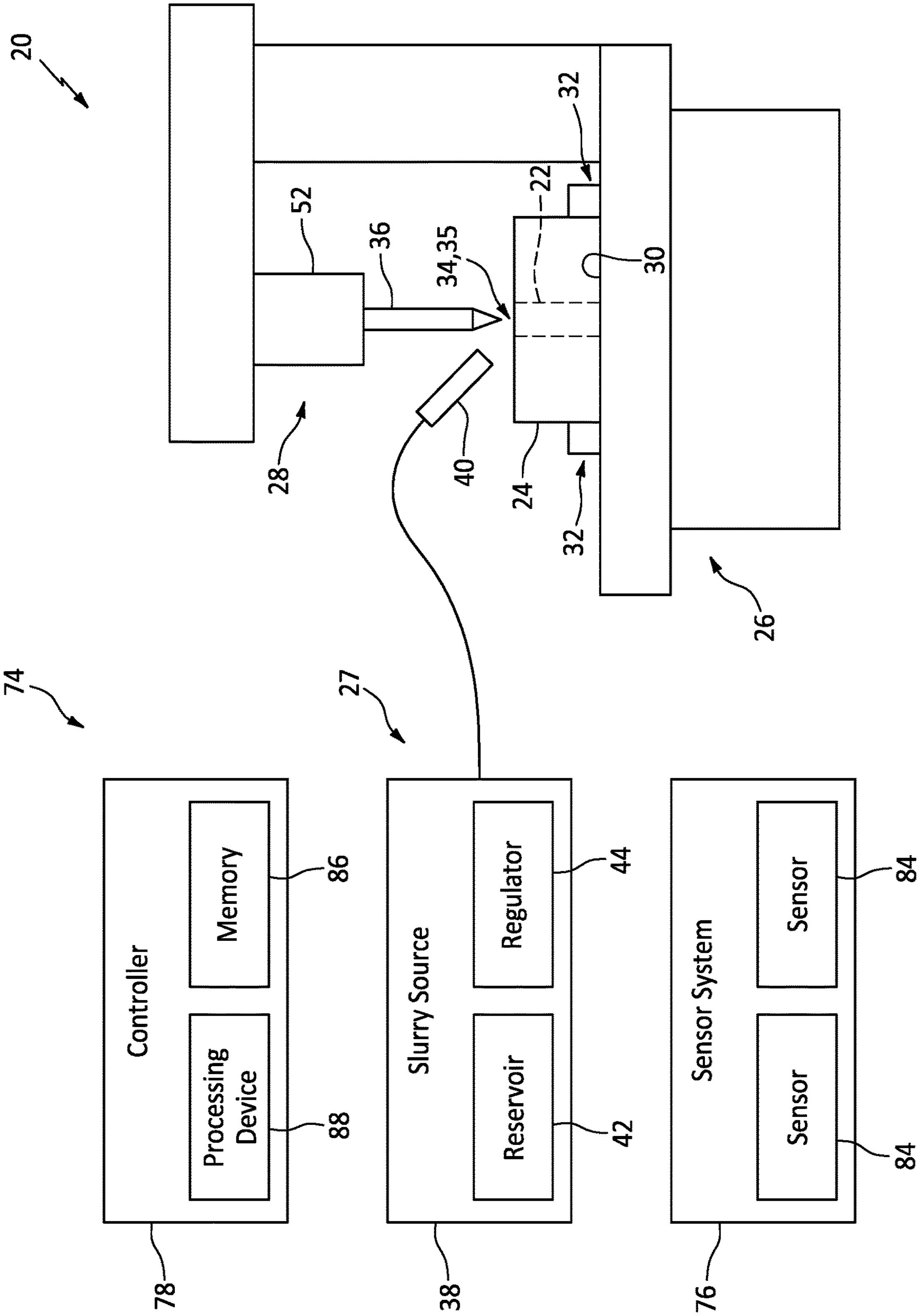
FIG. 1 is a schematic illustration of a machining system.

FIG. 1 illustrates a machining system 20 for forming and, more particularly, ultrasonic machining of an aperture 22 in a workpiece 24. This machining system 20 includes a workpiece support 26, a slurry delivery device 27 and an ultrasonic machining device 28.

The workpiece support 26 is configured to support the workpiece 24 during the forming of the aperture 22. The workpiece support 26 of FIG. 1, for example, includes a support surface 30 on which the workpiece 24 may be placed. This workpiece support 26 also includes a support fixture 32 configured to hold (e.g., temporally fix) a position and orientation of the workpiece 24 during the forming of the aperture 22.

The slurry delivery device 27 is configured to deliver a liquid slurry to an interface 34 at a gap 35 between an ultrasonic machining tool 36 (e.g., a bit) of the ultrasonic machining device 28 and a location on the workpiece 24 where the aperture 22 is to be formed. The slurry delivery device 27 of FIG. 1, for example, includes a slurry source 38 and at least one slurry nozzle 40. The source 38 may include a slurry reservoir 42 and a slurry flow regulator 44. The reservoir 42 is configured to contain a quantity of the slurry before, during and/or after the forming of the aperture 22. The reservoir 42, for example, may be configured as a tank, a cylinder, a pressure vessel or any other container. The flow regulator 44 is configured to direct a regulated flow of the slurry from the reservoir 42 to the nozzle 40. The flow regulator 44, for example, may be configured as, or may otherwise include, a pump and/or a valve assembly. The nozzle 40 is configured to direct the slurry received from the source 38 (e.g., the flow regulator 44) as a flow (e.g., a stream, a jet, etc.) towards/to the tool-workpiece interface 34; e.g., into the gap 35.

The slurry delivery device 27 may continuously (or intermittently) provide the slurry to the tool-workpiece interface 34 during the forming of the aperture 22. By providing the slurry to the tool-workpiece interface 34 throughout the forming of the aperture 22, the slurry delivery device 27 may displace previously used slurry at the tool-workpiece interface 34 with fresh slurry from the source 38. This at least partial (or complete) replacement of the slurry at the tool-workpiece interface 34 may remove debris generated as a byproduct from the forming of the aperture 22, where the debris may be carried away with the displaced used slurry. The slurry delivery device 27 is therefore also configured to remove the debris from the tool-workpiece interface 34.

The slurry includes a plurality of abrasive particles suspended within and/or otherwise carried by a carrier liquid. The abrasive particles may include carbide particles such as silicon carbide particles and/or boron carbide particles or diamond particles. Examples of the carrier liquid may include water and/or oil.

Figure 2:
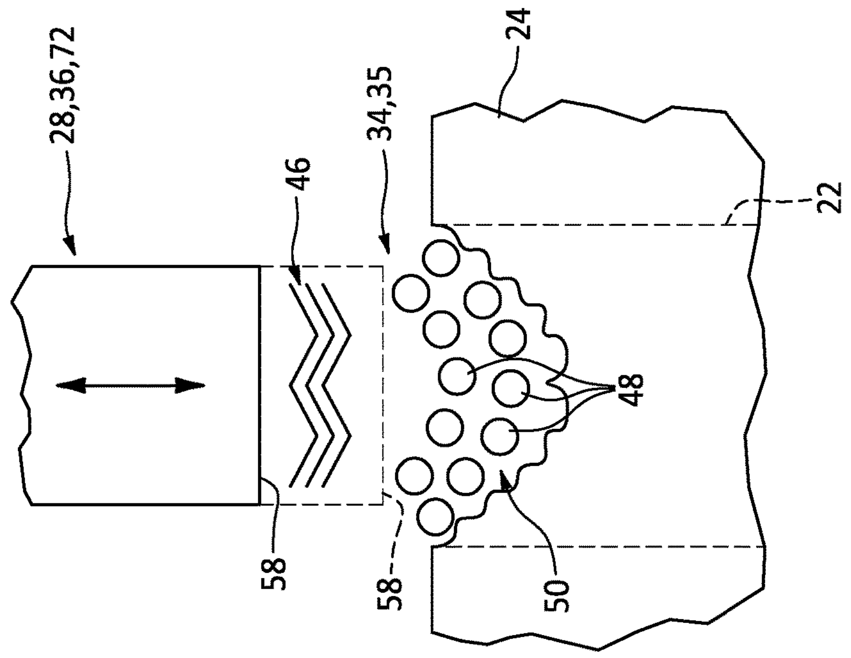
FIG. 2 is a schematic illustration of an interface between an ultrasonic machining tool and a workpiece during transmission of ultrasonic vibrations.

The ultrasonic machining device 28 is configured to generate ultrasonic vibrations (e.g., vibrations with a frequency equal to or greater than 20 kHz) and transmit those ultrasonic vibrations via sound waves into the slurry at the tool-workpiece interface 34. Referring to FIG. 2, the ultrasonic vibrations 46 excite movement of the abrasive particles 48 within the slurry 50 at the tool-workpiece interface 34, which may cause at least some of the abrasive particles 48 to repetitively contact (e.g., impinge against, strike, etc.) the workpiece 24. The repetitive contact between the abrasive particles 48 and the workpiece 24 may form microfractures in the workpiece material at the tool-workpiece interface 34 and thereby erode (e.g., machine away) the workpiece material. The ultrasonic machining device 28 is therefore configured to form (e.g., machine) the aperture 22 in the workpiece 24 at the tool-workpiece interface 34.

The ultrasonic machining device 28 of FIG. 1 includes a tool holder 52 (e.g., a spindle, a chuck, etc.) and the machining tool 36. The tool holder 52 is configured to support and hold the machining tool 36. The tool holder 52 may also be configured to position the machining tool 36 relative to the workpiece 24. The tool holder 52, for example, may be configured as or otherwise included as part of a robot manipulator or a support fixture.

Figure 3:
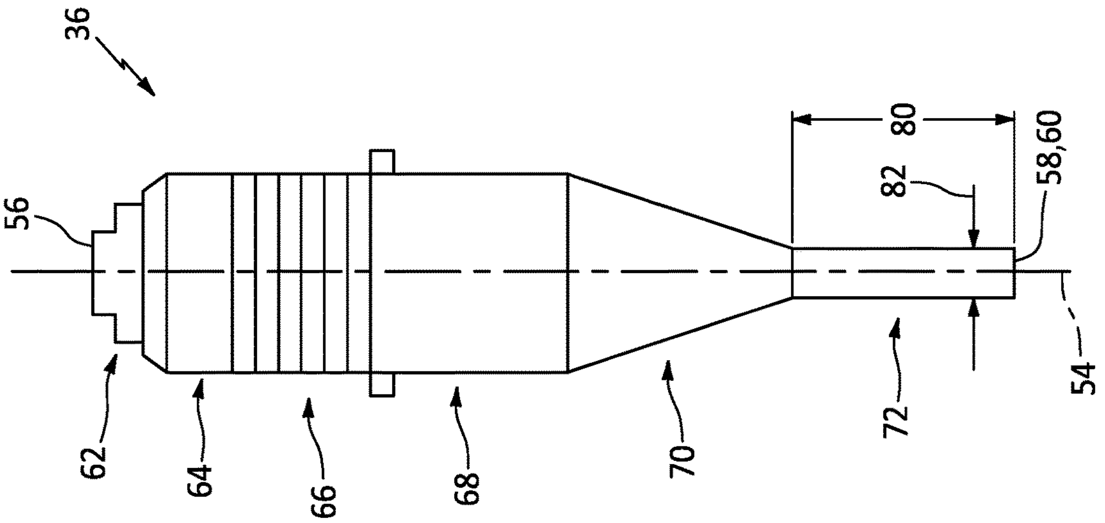
FIG. 3 is an illustration of the ultrasonic machining tool.

Referring to FIG. 3, the machining tool 36 extends along a longitudinal centerline 54 between a back end 56 of the machining tool 36 and a tip 58 at a front end 60 of the machining tool 36. This machining tool 36 of FIG. 3 includes a tool mount 62, a tool back mass 64, a tool transducer 66, a tool front mass 68, a tool horn 70 and a tool head 72. The tool mount 62 is arranged at the tool back end 56 and is configured to mate with and attach to the tool holder 52 of FIG. 1. The tool back mass 64 is arranged longitudinally between and is connected to the tool mount 62 and the tool transducer 66. The tool transducer 66 is arranged longitudinally between and is connected to the tool back mass 64 and the tool front mass 68. This tool transducer 66 is configured to generate the ultrasonic vibrations within the machining tool 36. The tool front mass 68 is arranged longitudinally between and is connected to the tool transducer 66 and the tool horn 70. The tool horn 70 is arranged longitudinally between and is connected to the tool front mass 68 and the tool head 72. This tool horn 70 is configured with a tapered geometry to amplify a vibrational amplitude of the ultrasonic vibrations communicated through the machining tool 36 from the tool transducer 66 to the tool head 72. The tool head 72 is arranged at the tool front end 60 and projects longitudinally to the tool tip 58. This tool head 72 of FIG. 2 is configured as a transmitter for transmitting the amplified ultrasonic vibrations 46 into the slurry 50 at the tool-workpiece interface 34.

Figure 4:
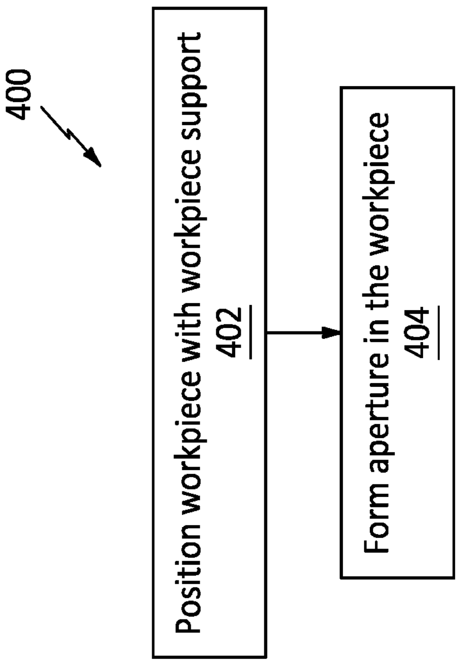
FIG. 4 is a flow diagram of a method for forming an aperture in the workpiece.

FIG. 4 is a flow diagram of a method 400 for forming (e.g., ultrasonic machining) the aperture 22 in the workpiece 24. The aperture 22 may be a perforation, a through-hole, a recess, a channel, a notch, an indentation or any other type of volume extending partially into or through the workpiece 24. The workpiece 24 may be constructed from a hard and/or brittle material such as a ceramic; e.g., a pure ceramic material, a ceramic matric composite material, etc. The workpiece 24 may be configured as or included as part of a component for a gas turbine engine, examples of which may include an airfoil, a platform, a shroud, a blade outer air seal (BOAS), a liner and a flowpath wall. The method 400 of the present disclosure, however, is not limited to gas turbine engine workpiece applications. Furthermore, while the method 400 is described below with reference to the machining system 20 described above, the method 400 may alternatively be performed with other machining system arrangements.

In step 402, the workpiece 24 is positioned with the workpiece support 26.

In step 404, the aperture 22 is formed in the workpiece 24. The slurry delivery device 27, for example, directs a flow of the slurry to the tool-workpiece interface 34 through, for example, the nozzle 40. This flow of the slurry may maintain a minimum quantity of the slurry at the tool-workpiece interface 34 such that the gap 35 between the tool tip 58 and the workpiece 24 remains full of the slurry. The flow of the slurry may also maintain a flow (e.g., a current) of the slurry into, through and out of the gap 35 between the tool tip 58 and the workpiece 24. While this slurry is present at, and/or flowing through, the tool-workpiece interface 34, the machining tool 36 generates the ultrasonic vibrations and transmits those ultrasonic vibrations into the slurry at the tool-workpiece interface 34 towards the workpiece 24. These ultrasonic vibrations excite movement of the abrasive particles within the slurry such that at least some of the abrasive particles repetitively contact and vibrate against the workpiece 24 at the tool-workpiece interface 34. This vibratory contact between the abrasive particles and the workpiece 24 may form microfractures in the workpiece material and erode away the workpiece material at the tool-workpiece interface 34. The aperture 22 may thereby be formed (e.g., machined) at the tool-workpiece interface 34 in the workpiece 24.

A formation rate (e.g., machining speed) of the aperture 22 into the workpiece 24 may depend on various parameters. These parameters may include, but not limited to:

- Amplitude of the ultrasonic vibrations at the tool-workpiece interface 34;
- Static pressure of the slurry at the tool-workpiece interface 34;
- Concentration of the abrasive particles within the slurry at the tool-workpiece interface 34; and
- Size and distribution of the abrasive particles within the slurry at the tool-workpiece interface 34.

Ideally, where these parameters are maintained substantially constant, the aperture formation rate (e.g., machining speed) should remain substantially constant independent of penetration depth of the tool head 72 into the workpiece 24; e.g., a measure of how far the tool head 72 projects into the aperture being formed, which may correspond to aperture depth. However, the aperture formation rate in practice may decrease as the tool penetration depth (e.g., the aperture depth) increases. The aperture formation rate may even approach a zero value (e.g., zero speed) as the tool penetration depth approaches a critical value. This critical value may be about ten millimeters (10 mm); however, the specific value may vary based on other aperture characteristics (e.g., diameter, geometry, etc.) and/or material characteristics (e.g., workpiece hardness, etc.).

A decrease in the formation rate may be caused at least in part to a decrease in a concentration of the abrasive particles in the gap 35 between the tool tip 58 and the workpiece 24 at the tool-workpiece interface 34. For example, as the tool penetration depth (e.g., the aperture depth) increases, it may be more difficult for the fresh slurry to flow into the partially formed aperture as well as more difficult for the used slurry with the debris to flow out of the partially formed aperture. In addition, as the same abrasive particles remain in the gap 35 between the tool tip 58 and the workpiece 24 at the tool-workpiece interface 34, those abrasive particles may decrease in size, become dull and/or otherwise wear. The worn abrasive particles may thereby become less efficient at machining away the workpiece material.

To mitigate or prevent the reduction of the aperture formation rate as the tool penetration depth (e.g., the aperture depth) increases, the machining system 20 of FIG. 1 includes a control system 74 (e.g., an operating system) which may implement (e.g., closed-loop) feedback control during the aperture formation method 400.

The control system 74 is configured to monitor one or more feedback parameters for the machining system 20 during machining system operation and, in particular, during the forming of the aperture 22 in the workpiece 24. The control system 74 is also configured to provide control signals to one or more components 27 and 28 of the machining system 20 in order to control operation of one or more of those machining system components 27 and 28. At least some of these control signals may be generated based on the monitored feedback parameters. The control system 74 may thereby implement feedback control of the machining system 20 and its components 27 and 28. The control system 74 of FIG. 1, for example, includes a sensor system 76 and a controller 78.

The sensor system 76 is configured to sense one or more operational characteristics; e.g., variables, values, etc. These operational characteristics may include or may be indicative of the feedback parameters. Examples of the feedback parameters may include:

- Load (e.g., pressure) applied between the machining tool 36 and the tool holder 52;
- Amplitude of the ultrasonic vibrations generated by the tool transducer 66 and/or transmitted by the tool head 72;
- Frequency of the ultrasonic vibrations generated by the tool transducer 66 and/or transmitted by the tool head 72;
- Spatial position (e.g., vertical position, alignment, etc.) of the machining tool 36 (e.g., the tool head 72, the tool tip 58, etc.) relative to a reference (e.g., the workpiece 24, the workpiece support 26, etc.);
- Rate (e.g., speed) of machining tool longitudinal movement (e.g., penetration into the workpiece 24);
- Fluid pressure of the slurry at the tool-workpiece interface 34;
- Fluid flowrate of the slurry through the tool-workpiece interface 34;
- Fluid pressure of the slurry provided to, flowing through, and/or directed out of the nozzle 40;
- Fluid flowrate of the slurry provided to, flowing through, and/or directed out of the nozzle 40; and/or
- Size of the tool head 72 (e.g., longitudinal length 80 of the tool head 72 of FIG. 3, lateral width 82 (e.g., diameter) of the tool head 72, etc.).

The sensor system 76 is further configured to communicate sensor data indicative of the operational characteristics and/or the feedback parameters to the controller 78.

The sensor system 76 may include one or more sensors 84. Examples of these sensors 84 include, but are not limited to, a pressure sensor, a force sensor, a flow meter, a position sensor and a dimension measurement device.

The controller 78 is configured to generate and provide the control signals to the machining system components 27, 28 and 76. Some of these control signals may be generated using (e.g., closed-loop) feedback control logic. For example, controller 78 may monitor one or more of the feedback parameters to determine the (e.g., real time) formation rate of the aperture 22. Where the aperture formation rate is equal to or less then a threshold, the controller 78 may signal one or more of the machining system components 27 and 28 to adjust an operational parameter. This process may be repeated until the aperture formation rate rises above the threshold and/or another one or more thresholds are met.

The controller 78 may be implemented with a combination of hardware and software. The hardware may include memory 86 and at least one processing device 88, which processing device 88 may include one or more single-core and/or multi-core processors. The hardware may also or alternatively include analog and/or digital circuitry other than that described above.

The memory 86 is configured to store software (e.g., program instructions) for execution by the processing device 88, which software execution may control and/or facilitate performance of one or more operations such as those described in the methods below. The memory 86 may be a non-transitory computer readable medium. For example, the memory 86 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 5:
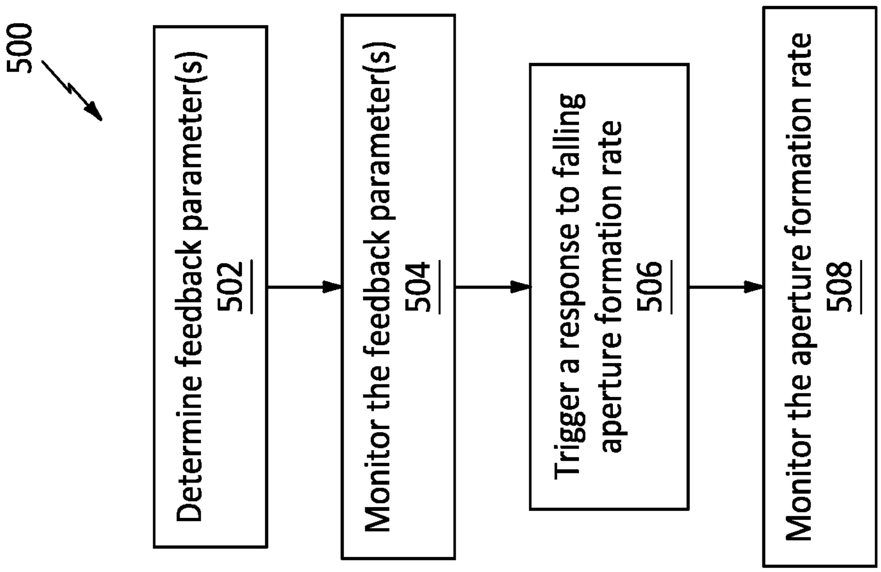
FIG. 5 is a flow diagram of a method for controlling ultrasonic machining.

FIG. 5 is a flow diagram of a method 500 for controlling ultrasonic machining of the aperture 22. For ease of description, this control method 500 is described below with reference to the machining system 20. The method 500, however, may also be used for various other machining system configurations.

In step 502, one or more of the feedback parameters are determined. The sensor system 76, for example, may sense one or more of the operational characteristics and generate sensor data indicative of/based on the sensed operational characteristics. This sensor data is then communicated to the controller 78. This sensor data may include or be indicative of the feedback parameters. Where the sensor data is indicative of the feedback parameters (e.g., further processing is needed to determine the feedback parameters), the controller 78 may process the sensor data to determine the feedback parameters.

In step 504, one or more of the feedback parameters are monitored. The controller 78, for example, may monitor the feedback parameter associated with the spatial position of the machining tool 36 and its tool head 72. A change of the spatial position (e.g., downwards in FIG. 1) over time corresponds to a feed rate of the tool head 72; e.g., an estimated formation rate of the aperture 22. Where this feed rate is outside of (e.g., greater than or less than) a (e.g., normal) threshold feed rate range, the control system 74 may determine the size of the tool head 72. The sensor system 76, for example, may measure the longitudinal length 80 of the tool head 72 and/or the lateral width 82 (e.g., diameter) of the tool head 72 and provide that measurement data to the controller 78. The controller 78 may process this measurement data to determine the (e.g., actual) aperture formation rate. For example, a difference between the measured tool penetration depth (e.g., the aperture depth) and the longitudinal wear of the tool head 72 corresponds to the actual tool penetration depth. The controller 78 may process this actual tool penetration depth to determine the actual aperture formation rate.

In step 506, where the aperture formation rate is less than a formation rate threshold, the controller 78 may trigger a (e.g., adaptive) response. The controller 78, for example, may signal the slurry delivery device 27 to adjust one or more slurry delivery parameters. For example, the controller 78 may signal the slurry delivery device 27 to increase a flowrate and/or a pressure of the slurry to the tool-workpiece interface 34. The increased flowrate and/or pressure may increase the quantity of fresh slurry directed into the gap 35 between the tool tip 58 and the workpiece 24 as well as increase the outflow of the used slurry and the debris carried thereby from the gap 35 between the tool tip 58 and the workpiece 24. This slurry replacement may increase a concentration of the abrasive particles within the slurry at the tool-workpiece interface 34 as well as replace dull abrasive particles with fresh sharp abrasive particles. The increase in the slurry flowrate may thereby increase machining efficiency and, thus, increase the aperture formation rate. A setpoint for the new increased flowrate of the slurry may be determined using a physics-based control model implemented by the controller 78.

In step 508, the control system 74 continues to monitor the aperture formation rate in real time during the forming of the aperture 22. Where the aperture formation rate is (or decreases) below the formation rate threshold (or another threshold), the slurry flowrate and/or pressure may be further increased. However, where the aperture formation rate is (or increases) a certain amount above the formation rate threshold (or another threshold), the slurry flowrate and/or pressure may be decreased. This process may be iteratively repeated during the formation of the aperture 22 until the aperture formation rate is within a desired range. The control system 74 may thereby implement automatic feedback control of the slurry delivery device 27 and flow of the slurry through the gap 35 between the tool tip 58 and the workpiece 24.

Figure 6B:
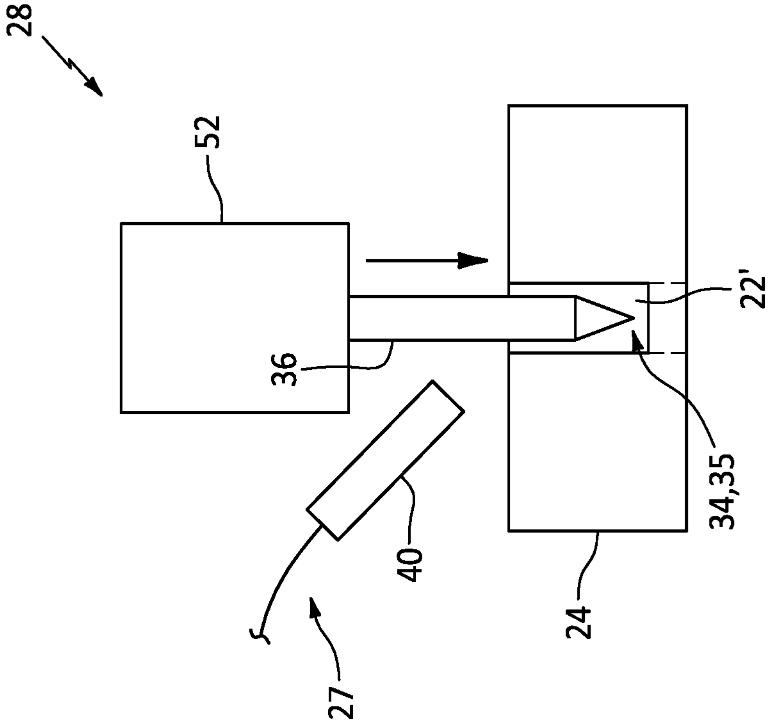
FIGS. 6A-B are schematic illustrations depicting a sequence for flushing a partially formed aperture.
Figure 6A:
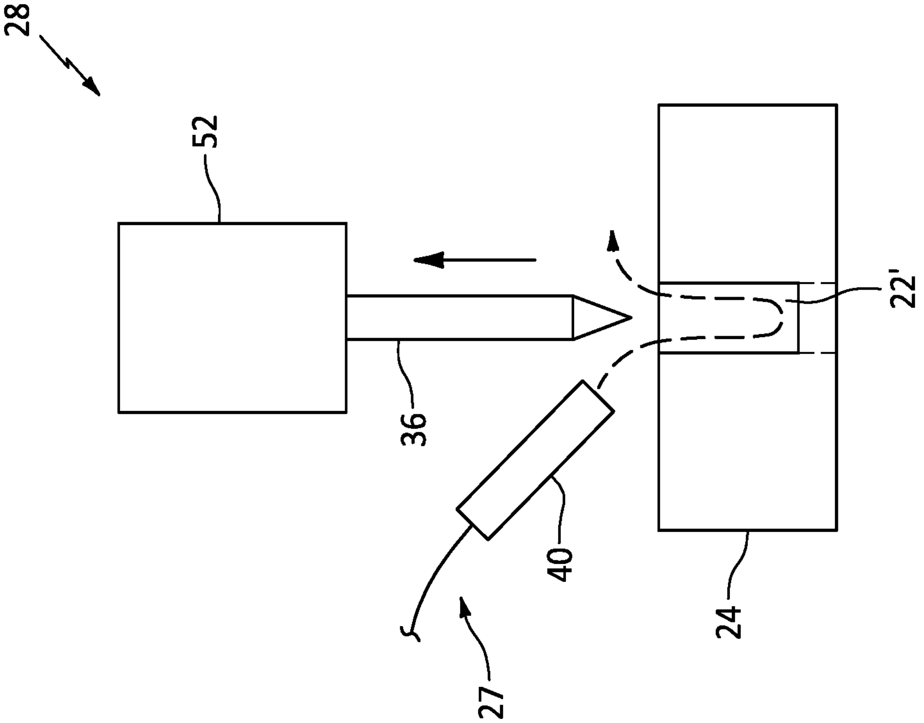

In some embodiments, where the aperture formation rate decreases below a second (e.g., minimum) formation rate threshold, the control system 74 may control the machining system components 27 and 28 to flush out the partially formed aperture in the workpiece 24. For example, referring to FIG. 6A, the tool holder 52 may remove the machining tool 36 from the partially formed aperture 22'. While the machining tool 36 is removed, the slurry delivery device 27 may direct a flow of the slurry into the partially formed aperture to remove the used slurry as well as remove the workpiece debris that may have collected within the partially formed aperture. Referring to FIG. 6B, the tool holder 52 may subsequently position the tool head 72 back into the partially formed aperture and the formation (e.g., machining) of the aperture 22 in the workpiece 24 may be resumed.

Figure 8:
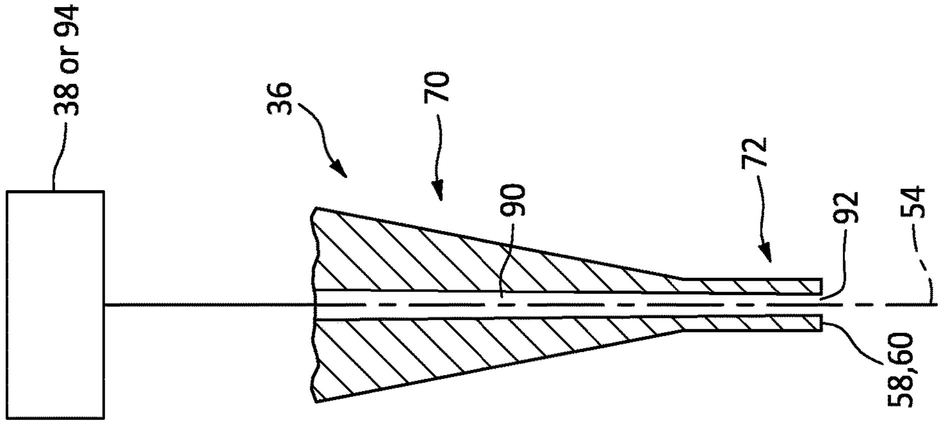
FIG. 8 is an enlarged partial sectional illustration of the ultrasonic machining tool with the internal passage fluidly coupled with another component of the machining system.
Figure 7:
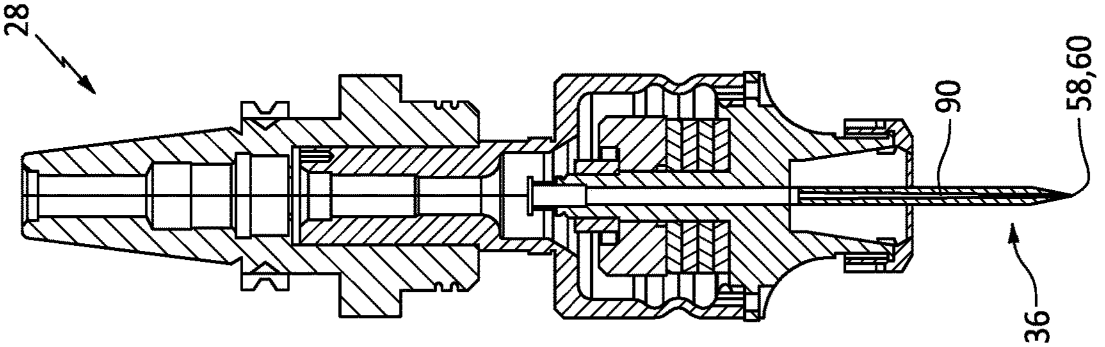
FIG. 7 is a sectional illustration of the ultrasonic machining tool configured with an internal passage.
Figure 9B:
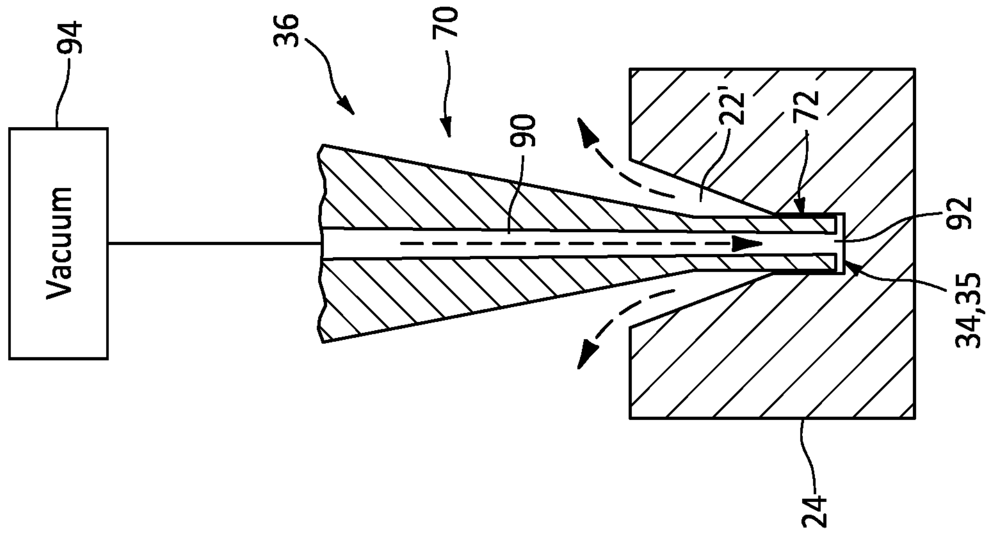
FIG. 9B is a partial sectional illustration depicting the internal passage of the ultrasonic machining tool extracting slurry from the tool-workpiece interface.
Figure 9A:
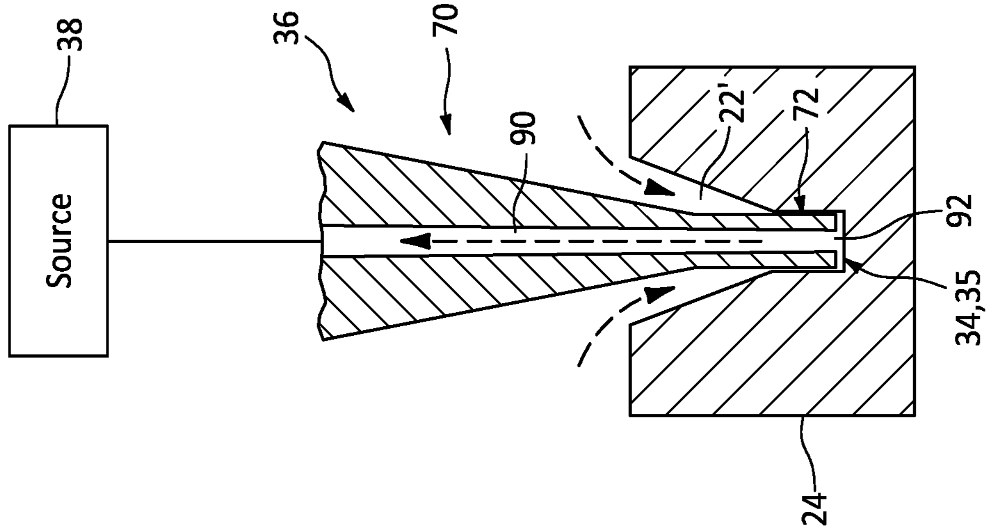
FIG. 9A is a partial sectional illustration depicting the internal passage of the ultrasonic machining tool directing slurry to a tool-workpiece interface.

In some embodiments, referring to FIGS. 7 and 8, the machining tool 36 may be configured with an internal passage 90; e.g., an inner bore. This internal passage 90 extends longitudinally within the machining tool 36 and its tool head 72 to an orifice 92 in the tool tip 58. The internal passage 90 is configured to direct the slurry to and/or from the tool-workpiece interface 34; see FIGS. 9A and 9B. For example, the internal passage 90 may be fluidly coupled with the source 38. In such embodiments, referring to FIG. 9A, the fresh slurry may be directed through the internal passage 90 to the tool-workpiece interface 34. Here, the tool head 72 may also be configured as the nozzle 40, or an additional nozzle. In another example, the internal passage 90 may be fluidly coupled with a vacuum device 94. In such embodiments, referring to FIG. 9B, the used slurry and the workpiece debris therewithin may be extracted out of the tool-workpiece interface 34 through the internal passage 90. In both examples, the internal passage 90 may facilitate (a) flushing of the gap 35 of FIG. 2 between the tool tip 58 and the workpiece 24 and/or (b) the normal flow of the slurry through the gap 35 between the tool tip 58 and the workpiece 24.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for machining a workpiece, comprising:

forming an aperture in the workpiece using a machining system comprising an ultrasonic machining device, a slurry delivery device and a controller, the slurry delivery device comprising a passage that extends within the ultrasonic machining device to a tip of the ultrasonic machining device, the forming of the aperture comprising delivering a slurry to an interface between the ultrasonic machining device and the workpiece using the slurry delivery device, and transmitting ultrasonic vibrations into the slurry using the ultrasonic machining device;

monitoring a feedback parameter during the forming of the aperture using the controller; and adaptively adjusting a slurry delivery parameter for the slurry delivery device during the forming of the aperture based on the feedback parameter using the controller;

wherein the slurry is delivered to the interface through the passage during the forming of the aperture, and the slurry is removed from the interface through the passage during the forming of the aperture.

2. The method of claim 1, wherein the workpiece comprises a ceramic matrix composite material.

3. The method of claim 1, wherein the slurry comprises a plurality of abrasive particles within a carrier liquid.

4. The method of claim 3, wherein the plurality of abrasive particles comprise a carbide and/or diamond.

5. The method of claim 1, wherein the slurry delivery parameter comprises a pressure of the slurry.

6. The method of claim 1, wherein the slurry delivery parameter comprises a flowrate of the slurry.

7. The method of claim 1, wherein the adjusting of the slurry delivery parameter initiates flushing out of the slurry at the interface by directing the slurry through the ultrasonic machining device.

8. The method of claim 7, wherein the slurry is pumped through the ultrasonic machining device to the interface.

9. The method of claim 7, wherein the slurry is drawn out from the interface into the ultrasonic machining device.

10. The method of claim 1, wherein the feedback parameter further comprises a load on the ultrasonic machining device.

11. The method of claim 1, wherein the feedback parameter further comprises a size of a tool of the ultrasonic machining device.

12. The method of claim 1, wherein the slurry delivery parameter is adjusted based on a physics-based model.

13. The method of claim 1, wherein the workpiece comprises a component of a gas turbine engine.

14. The method of claim 1, further comprising:

providing a control signal based on the feedback parameter; and communicating the control signal to the slurry delivery device to adjust the feedback parameter.

15. The method of claim 1, further comprising adjusting the slurry delivery parameter to flush out the slurry at the interface by directing the slurry through the ultrasonic machining device.

16. The method of claim 1, wherein the controller automatically controls at least one of a flowrate or a pressure of the slurry to the workpiece.

17. The method of claim 1, wherein, during the forming of the aperture, the controller operates as a closed loop when adaptively adjusting based on the slurry delivery parameter.

* * * * *